June 6, 1961   J. D. RICHARDSON ET AL   2,987,277
AIRCRAFT CONTROL SYSTEM
Filed Oct. 14, 1958   2 Sheets-Sheet 1
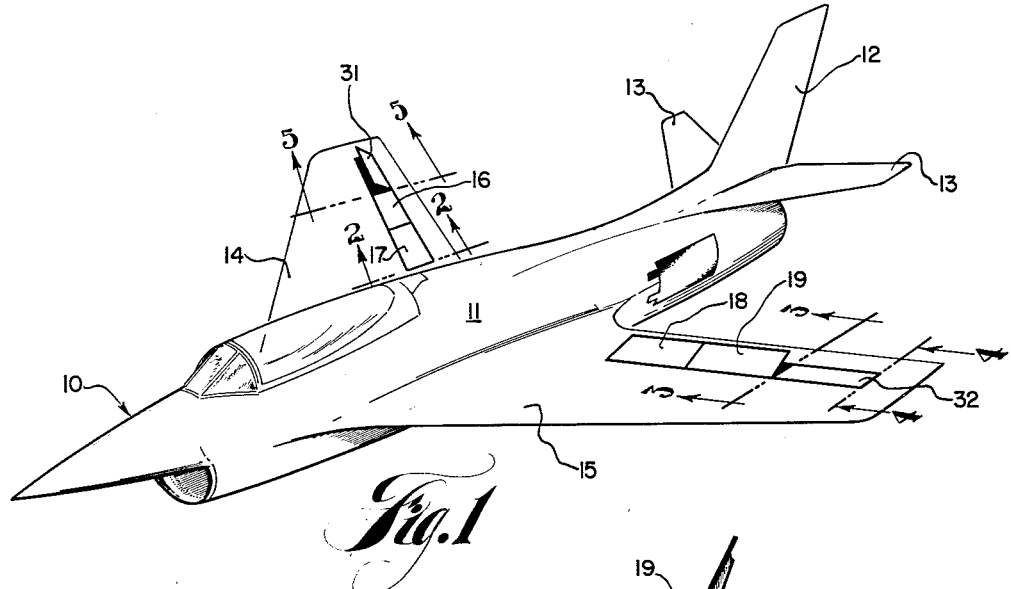
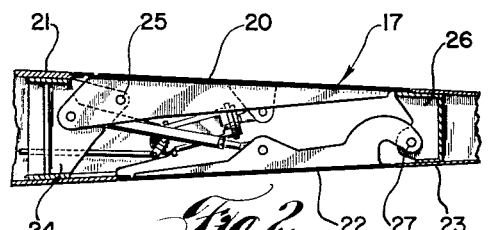
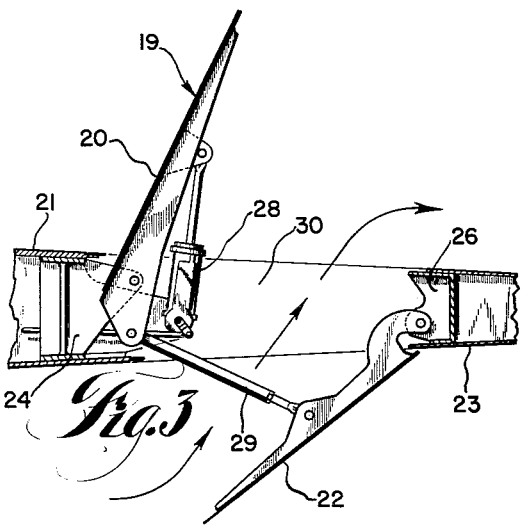
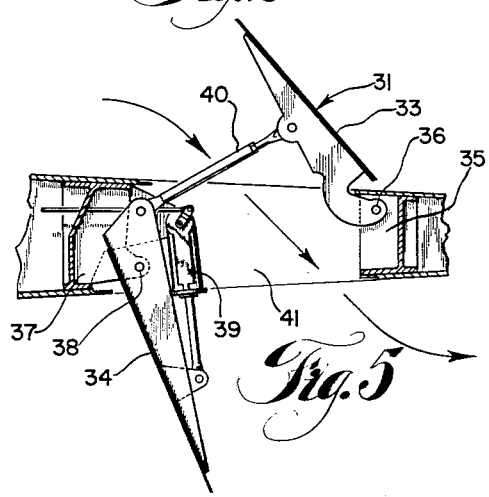
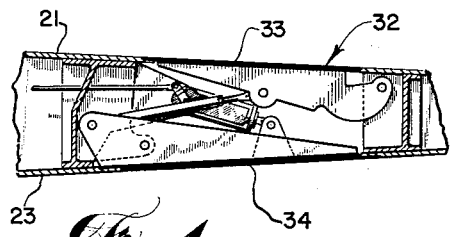
INVENTORS
JOHN D. RICHARDSON
DAVID S. STEPHENSON
BY
ATTORNEY

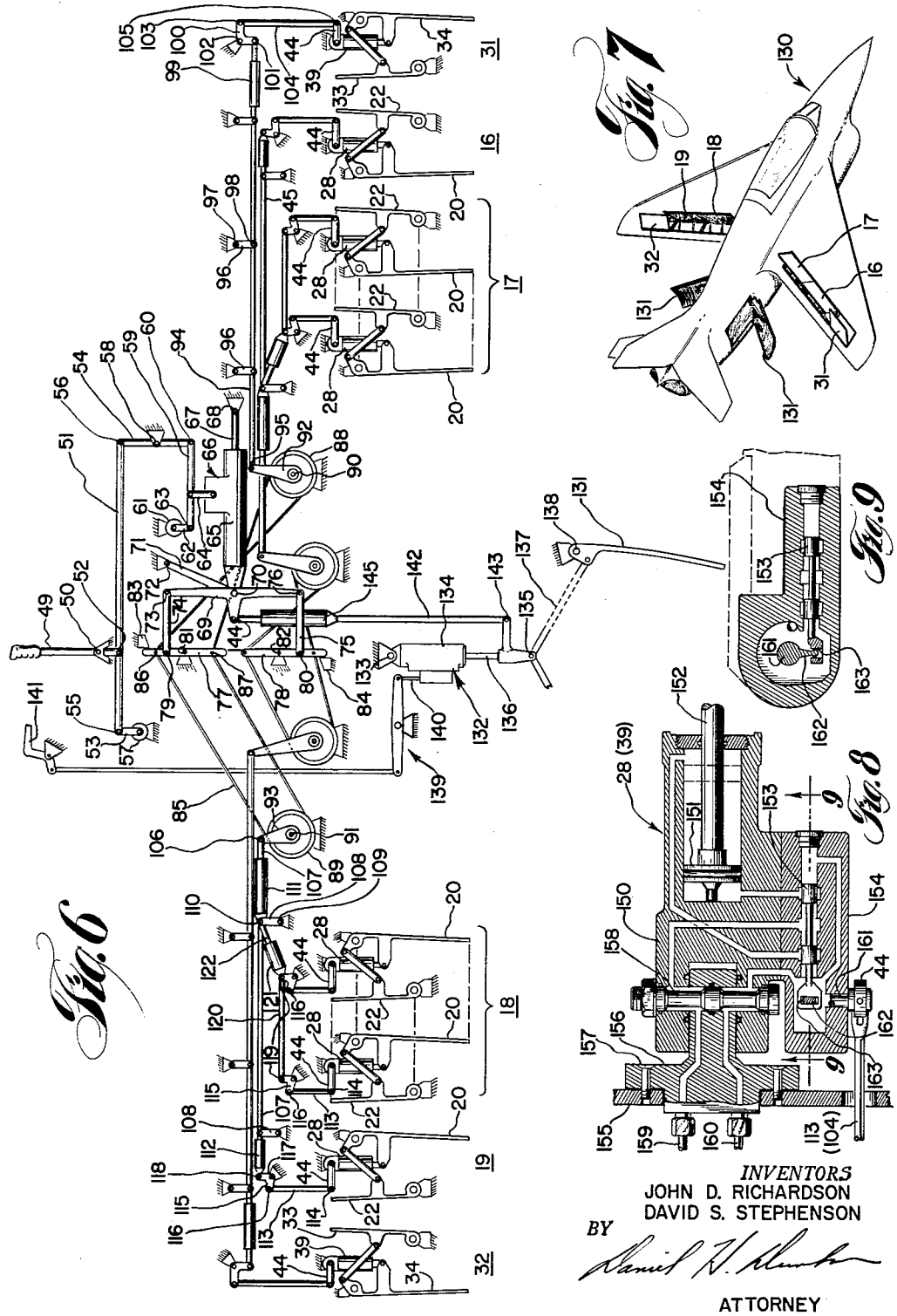

United States Patent Office 2,987,277
Patented June 6, 1961

2,987,277
AIRCRAFT CONTROL SYSTEM
John D. Richardson, Reynoldsburg, and David S. Stephenson, Columbus, Ohio, assignors to North American Aviation, Inc.
Filed Oct. 14, 1958, Ser. No. 767,209
9 Claims. (Cl. 244—90)

This invention relates to aircraft, and is concerned with an improved roll control system which may be advantageously utilized in connection with flight operation of winged-type air vehicles.

Modern high-performance airplanes are often provided with a roll control system comprised of conventional spoiler-slot-deflector units positioned in each wing member thereof, and each such spoiler-slot-deflector unit is further provided with suitable means whereby it may be selectively actuated during flight to cause rotation of the airplane about its longitudinal axis in a desired direction. The operation of one such spoiler-slot-deflector unit typically functions to decrease the aerodynamic lift acting upon the particular wing member associated therewith, and the resulting unbalanced load condition establishes the force moment required for achieving a roll maneuver. With respect to the operation of certain aircraft having spoiler-slot-deflector type roll control systems, excessive yawing moments and undesirable losses in aerodynamic lift have been observed during spoiler-controlled maneuvers.

This invention contemplates use of an improved spoiler-slot-deflector system which may be utilized in winged-aircraft for overcoming the previously-mentioned disadvantages associated with conventional spoiler-slot-deflector units. Basically, the system of our invention employs spoiler-slot-deflector units which are each comprised of a normal portion which functions in a conventional manner, and an inverted portion which functions to minimize or eliminate the adverse flight characteristics otherwise created during flight operation of the conventionally constructed portion of an opposed unit. Further, this invention contemplates the provision of suitable means for properly actuating and correlating operation of the inverted portion of a first spoiler-slot-deflector unit with the operation of the normal portion of a second spoiler-slot-deflector unit, and for correlating operation of the inverted portion of said second unit with the operation of the normal portion of the first spoiler-slot-deflector unit.

It is an object of this invention to provide a roll control system of the spoiler-slot-deflector type which may be utilized in winged-aircraft for obtaining improved flight characteristics.

Another object of our invention is to provide an improved spoiler-slot-deflector type roll control system for aircraft, which system is characterized by having a greatly reduced operational yawing moment in comparison with the yawing moment associated with a conventional spoiler-slot-deflector installation of comparable roll-producing capability.

Another object of this invention is to provide a spoiler-slot-deflector type roll control system for aircraft which may be utilized to obtain reduced side load effects and reduced yawing velocities in comparison with a conventional roll control system of the spoiler-slot-deflector type and of comparable size.

Another object of this invention is to provide an aircraft roll control system with means for minimizing the loss in aerodynamic lift associated with the operation of conventional spoiler-slot-deflector roll control units.

A still further object of this invention is to provide an aircraft roll control system of the spoiler-slot-deflector type with means which may be utilized to obtain improved flight roll characteristics without adverse change of the rolling moment associated therewith.

Another object of this invention is to provide an improved aircraft roll control system which may be made to effectively cooperate with a speed brake system to provide for airspeed reduction without loss of lateral control.

Another object of this invention is to provide an improved roll control system which may be installed in winged-type aircraft without difficulty, which may be readily maintained, and which has a high degree of operational reliability.

Other objects and advantages of our invention will become apparent during consideration of the drawings and detailed description.

In the drawings:
FIG. 1 is a perspective view of an airplane incorporating the roll control system of this invention;
FIGS. 2 through 5 are partial sectional views taken along lines 2—2 through 5—5 of FIG. 1, respectively;
FIG. 6 is a schematic illustration of one arrangement for obtaining proper actuation of the control system illustrated in FIGS. 1 through 5;
FIG. 7 illustrates an airplane incorporating the roll control system of this invention in combination with one form of aircraft speed brake arrangement; and
FIGS. 8 and 9 are sectional views of an hydraulic actuator means which may be utilized in the practice of our invention.

Referring to the drawings, FIG. 1 illustrates an airplane 10 which incorporates a preferred embodiment of the control system of this invention. Airplane 10 includes a fuselage portion 11, a vertical stabilizer 12, horizontal stabilizer means 13, and attached wing members 14 and 15. During flight, rotation of airplane 10 about its longitudinal axis may be achieved in one direction through proper actuation of the normal spoiler-slot-deflector unit located in wing 14 and comprised of sections 16 and 17, and in an opposite direction through operation of a similar spoiler-slot-deflector unit located in wing member 15 and comprised of sections 18 and 19.

Details regarding the construction of normal spoiler-slot-deflector sections 16 through 19 are illustrated in FIGS. 2 and 3. In FIG. 2, section 17 is illustrated in a closed position; in FIG. 3, section 19 is illustrated in a fully open position. Each of sections 16 through 19 functions in a like manner, and includes a spoiler member 20 and a deflector member 22. When any one of sections 16 through 19 is in a closed condition, its spoiler member 20 and its deflector member 22 are generally positioned flush with upper wing surface 21 and flush with lower wing surface 23, respectively.

Spoiler 20 is connected to the support member 24 through pivot connection 25, and may be rotated about the axis of the connection. Deflector 22 is connected to support member 26 through the pivot connection designated 27. Each spoiler-slot-deflector section 16 through 19 is further provided with an actuator means 28 for effecting rotation of the spoiler member 21, and with rod means 29 for operatively connecting deflector member 22 to spoiler member 20. Each of units 16 through 19 is arranged in the wing member associated therewith so that slot 30 is provided when the spoiler and deflector components are moved from their closed position, thereby providing a passageway to conduct air from the underside of the wing member to the upper side thereof.

In a conventional spoiler-slot-deflector arrangement, individual normal units such as 16 through 19 only are located in opposed wing members. As hereinbefore noted, when a particular normal spoiler-slot-deflector unit is actuated to its open position a net loss in aerodynamic lift is obtained to establish a rolling moment.

However, it has been noted with respect to flight operation of certain aircraft having a conventional spoiler-slot-deflector type of roll control system, that excessive yawing moments, undesirable yawing velocities, and adverse side load effects have been established during spoiler-controlled maneuvers. We have discovered that greatly improved flight characteristics may be obtained by the provision of an inverted spoiler-slot-deflector section in addition to, or in substitution for a portion of, the normal spoiler-slot-deflector arrangement of a conventional unit. Such inverted spoiler-slot-deflector portions are designated as 31 and 32 in FIG. 1.

Details regarding the construction of inverted spoiler-slot-deflector sections 31 and 32 are illustrated in FIGS. 4 and 5. FIG. 4 illustrates section 32 in a closed position, whereas FIG. 5 illustrates section 31 in a fully open position. Sections 31 and 32 function in a like manner, are each comprised of generally similar components, and each basically include a spoiler member 33 and deflector member 34. Members 33 and 34 are positioned flush with upper and lower wing surfaces 21 and 23, respectively, when sections 31 and 32 are maintained in a closed condition.

Spoiler 33 is connected to the support member designated 35 through the pivot connection reference as 36, and rotates thereabout when actuated. Deflector member 34 is connected to the structural member 37 through the pivot connection designated 38. Each inverted section 31 and 32 is further provided with actuator means 39 for powering deflector member 34, and connecting means 40 for moving spoiler member 33 and deflector member 34 in unison. Connecting means 40 (and 29) are each pivotally connected at their extremes to their respectively associated spoiler and deflector members.

It is to be noted that conventional units 16 through 19 differ from inverted units 31 and 32 with respect to the relative location of their spoiler and deflector member pivot axes, and with respect to the direction of air flow through the slot means. With respect to units 16 through 19, air flow is upward through slot means 30 from the underside of the associated wing member to the upperside thereof. The direction of air flow is referenced by arrows in FIG. 3. With respect to units 31 and 32, air flow is downward through slot means 41 from the upperside of the associated wing member to the underside thereof as indicated by the arrows in FIG. 5.

In order that the normal and inverted spoiler-slot-deflector arrangement illustrated in FIGS. 1 through 5 might be utilized to obtain its optimum effectiveness, it is necessary that suitable means be provided for properly correlating actuation or operation of the individual normal and inverted spoiler-slot-deflector sections. One such means is schematically illustrated in FIG. 6, and is arranged to function in a manner whereby operation of normal sections 16 and 17 is paired with operation of inverted spoiler-slot-deflector section 32, and whereby actuation of normal spoiler-slot-deflector sections 18 and 19 is combined with actuation of the inverted spoiler-slot-deflector section designated 31.

It should be noted that the actuator means 28 (and 39) illustrated in FIGS. 1 through 6 are of a hydraulic type having appropriate follow-up control. Such actuators generally include a reversing or directional valve member incorporated in their body portion. Movement of an actuating arm (44) connected to the valve member through a given displacement with respect to the actuator body, results in corresponding extension or retraction of the actuator to thereby effect an opening or closing movement with respect to the connected spoiler and deflector components. When the actuator is extended to a degree corresponding to the movement of the valve member actuating arm, follow-up control prevents over-travel or over-extension thereof. Details of an actuator unit 28 are more completely illustrated in FIGS. 7 and 8.

As illustrated in FIG. 6, pilot control stick 49 is connected to an airframe component of the aircraft through pin 50, and is rotated about pin 50 in a lateral sense to cause movement of the rod 51 which is connected thereto through pin 52. Rod 51 is moved by control stick 49 to cause simultaneous rotation of lever arms 53 and 54 which are connected thereto by pins 55 and 56, respectively. Arm 53 is connected to a potentiometer device 57 supported by aircraft structure and comprising a part of an electrical control arrangement which does not constitute a portion of this invention. Lever arm 54 is connected to aircraft structure through pin 58, and has another end connected to rod 59 through pin 60. Rod 59 in turn is secured to aircraft structure through follow-up potentiometer device 61 and the operating arm 62 secured thereto. Pin 63 connects rod 59 to arm 62, and rod 59 is further connected to a valve arm 64 through a pin connection. Valve arm 64 is provided to obtain movement of a directional valve member (not shown) for hydraulic primary actuator means 65. When the position of the valve member for actuator means 65 is changed, relative movement is caused between the body portion 66 and the rod portion 67 thereof. Actuator means 65 is provided with a follow-up arrangement whereby the degree of extension or retraction thereof is only proportional to the degree of movement of valve arm 64.

The rod portion 67 of actuator means 65 is pivotally connected to aircraft structure through pin 68, and the body portion 66 of actuator means 65 is connected to a bar 69 having three arms through pin connection 70. Link 71 is connected at one extreme to aircraft structure through pin 72, and at the other extreme to bar 69 and actuator body 66 through pin 70. The upper arm of bar 69 is connected by pin 73 to link 74, and the lower arm thereof is connected to link 75 by pin 76. Links 74 and 75 are connected to bar members 77 and 78 through pins 79 and 80, respectively. As noted in FIG. 6, bar members 77 and 78 are attached to supporting aircraft structure by pin means 81 and 82, respectively, and rotate relative thereto in response to displacement of the location of pin connection 70. Stops 83 and 84 are provided to limit the degree of rotation of bar members 77 and 78, respectively, in a particular sense.

Associated with each of bar members 77 and 78 is a pair of pulleys, and each pair of pulleys is arranged to operate a pair of normal spoiler-slot-deflector sections in one wing with an inverted spoiler-slot-deflector section in the opposite wing through the linkage hereinafter described. Since the linkage arrangement for each pair of pulleys is identical, the same reference numerals may be used for corresponding elements of each arrangement.

Referring specifically to the linkage system which controls operation of normal spoiler-slot-deflector sections 18 and 19 with inverted spoiler-slot-deflector section 31, a cable 85 is secured at points 86 and 87 to bar member 77. Cable 85 frictionally engages the pulley members 88 and 89 which are connected to aircraft structure through pins 90 and 91, respectively. Cable 85 is arranged parallel between bar member 77 and pulley 89, but is crossed between bar member 77 and pulley 88. Rotation of bar member 77 in a counter-clockwise sense from its FIG. 6 position will cause counter-clockwise rotation of pulley 89 and clockwise rotation of pulley 88. Conversely, rotation of bar member 77 in a clockwise sense from a rotated position, will cause clockwise rotation of pulley 89, and counter-clockwise rotation of pulley 88. Fixedly attached to pulleys 88 and 89 are arm members 92 and 93, respectively.

Arm member 92 is connected by pin 95 to the rod 94 which is supported by the links designated 96. Each link 96 is connected to aircraft structure by a pin 97 and to rod 94 by pin 98. Rod 94 includes an override bungee 99, and is connected to bellcrank 100 through pin 101. A pin 102 connects bellcrank 100 to aircraft structure, whereas pin 103 connects another arm portion of bellcrank 100 to rod member 104. The valve arm 44 of actuator means 39 for section 31 is connected to rod member 104 through pin 105.

Arm member 93 on the other hand is connected by pin 106 to the rod 107 which is supported by the links designated 108. Each link 108 is connected to aircraft structure by a pin 109 and to rod 107 by a pin 110. Rod 107 also includes override bungees 111 and 112 to provide proper response characteristics therein in the manner of bungee means 99. The valve arm 44 for each actuator means 28 provided in sections 18 and 19 is connected to a rod 113 through a pin 114. Each rod 113 is further connected to a bellcrank 115 through a pin designated 116. Bellcranks 115 are supported by aircraft structure through a pin connection 117. The bellcrank 115 for section 19 is connected to bungee means 112 through pin 118. However, the bellcranks 115 for section 18 are connected to rod 107 through pins 119, rod 120, sequence bungee means 121, and rod increment 122. Increment 122 connects bungee means 121 to rod 107 through pin 110.

Movement of control stick 49 in a counter-clockwise direction about its pivot axis 50, as for a left-roll maneuver, causes movement of bar 59 in a leftward direction. The body 66 of actuator means 65 consequently is moved in a leftward direction, and bar 77 is caused to rotate counter-clockwise about its pivot 81. Bar 78 is prevented from rotating clockwise by stop means 84. Pulley 89 and lever arm 93 rotate in a counter-clockwise sense in response to counter-clockwise rotation of bar 77, and move rods 107 and 120 leftward. Each bellcrank 115 driven by rods 107 and 120 is thereby pivoted counter-clockwise; counter-clockwise rotation of each valve arm 44 for an actuator means 28 in sections 18 and 19 results. This causes the rod portion of the actuator means 28 for sections 18 and 19 to be extended to subsequently open sections 18 and 19. Simultaneously, counter-clockwise rotation of bar 77 causes clockwise movement of pulley 88 and lever arm 92 to move rod 94 rightward. Bellcrank 100 is pivoted counter-clockwise about its pivot 102, and causes valve arm 44 of the actuator means 39 for section 31 to be rotated counter-clockwise relative thereto. This causes the rod portion of said actuator means to be extended thereby opening section 31. Normal units 16 and 17 and the inverted unit 32 are maintained in a closed condition through the effectiveness of stop means 84. Thus, movement of control stick 49 for a left-roll maneuver will produce an opening of only sections 18, 19, and 31. Conversely, clockwise rotation of control stick 49 from its FIG. 6 neutral position results only in individual units 16, 17, and 32 being moved to their open position. In this situation, sections 18, 19, and 31 remain closed through the effectiveness of stop means 83.

FIG. 7 illustrates an airplane 130 which is provided with the roll control system of our invention in combination with a state-of-the-art speed brake system having speed brake door components 131. In the FIG. 7 illustration, the normal and inverted spoiler-slot-deflector sections 16 through 19, 31, and 32 have each been moved to a fully open position to thereby augment extended speed brake doors 131. As previously noted, the roll control system of our invention may be combined with a conventional speed brake system to provide for increased airspeed reduction capability without loss of lateral control. One portion of the control arrangement of FIG. 6 relates to a scheme for accomplishing the desired correlation between such systems.

A hydraulic power actuator means 132 is provided for moving speed brake door 131 (FIG. 6) to its open position. Pin means 133 connects the body 134 of actuator 132 to aircraft structure; pin 135 connects the extendible and retractable rod portion 136 of actuator 132 to a linkage designated 137. Linkage 137 is moved by rod 136 to cause door 131 to pivot about the pin 138 which connects it to aircraft structure. A linkage designated generally as 139 is provided for coupling the valve arm 140 of the valve member for actuator 132 to a manual control member 141. Rod 142 is connected to the third arm of bar 69 and actuator rod 136 through pins 143 and 144 and through the override bungee means 145.

When control stick 49, actuator 65, and link 71 are maintained in their FIG. 6 neutral position, extension of speed brake door 131 through extension of rod 136 also causes rod member 142 to rotate bar 69 counter-clockwise about its connection 70 to the body portion 66 of actuator 65. This in turn causes bars 77 and 78 to each rotate counter-clockwise about their axis 81 and 82, respectively. Each of sections 16 through 19 and 31 and 32 is moved to an open condition by simultaneous operation of both pairs of pulleys connected to bars 77 and 78, in the manner hereinbefore described. The increased balanced drag on airplane 130 augments the effectiveness of speed brake doors 131. Even though each mentioned spoiler-slot-deflector section is moved to its fully open position, proper roll control may be obtained by subsequent movement of control stick 49 in either direction from its FIG. 6 neutral position.

For example, movement of control stick 49 in the counter-clockwise direction for a roll maneuver to the left when speed brake doors 131 are open, causes movement of the body portion 66 of actuator 65 to the left in the manner previously noted. Such operation will cause bar 69 to be moved leftward thus pivoting bar 78 clockwise to a "closed" position but maintaining bar 77 in its pivoted "open" position. In the manner previously described, movement of bar 78 clockwise causes spoiler-slot-deflector sections 16, 17, and 32 to close thus cancelling the right-rolling moment produced thereby. The remaining left-rolling moment produced by operation of units 18, 19, and 31 is effective to cause a left-rolling maneuver which corresponds to the direction of movement of stick 49. An opposite result is obtained in connection with movement of control stick 49 rightward during operation of the speed brake system.

FIGS. 8 and 9 are provided to illustrate details of a hydraulic actuator, such as unit 28 (or 39), having a form of follow-up control in which the degree of extension or retraction of a rod portion is made proportional to the degree of displacement or rotation of valve arm 44. As noted in FIG. 8, which is a sectional view taken through actuator 28 in a somewhat horizontal plane with respect to FIG. 2, unit 28 is provided with a body portion 150, a piston 151 contained therein, a rod portion 152 connected to the piston and projecting outside body 150, and a valve member 153 which is contained in the housing 154 attached to body 150.

Body portion 150 is connected to the structural component 155 through mount 156, fasteners 157, and pivot 158. As noted in FIG. 8, pivot 158 comprises a portion of a swivel connection which ports high and low pressure hydraulic fluids between body portion 150 and hydraulic lines 159 and 160. Passageways are provided for porting high and low pressure hydraulic fluids from the swivel connection, through the directional valve, and to and from either side of piston 151. Rod 113 is connected to lever arm 44, and lever arm 44 turns the shaft designated 161 in response to movement of rod 113. A projection 162 on shaft 161 cooperates with the opening 163 provided in the extension of valve member 153. It is important to note that the axis of shaft 161 (which is the pivot for lever arm 44) must coincide with the axis of pivot connection 158. In this manner the follow-up control for actuator 28 may be made a direct function of angular displacement of valve arm 44. Correlation of extension and retraction of rod 152 with clockwise or counter-clockwise rotation of arm 44 is accomplished through properly connecting lines 159 and 160 to high pressure and low pressure hydraulic fluid reservoirs.

A consideration of comparative performance data relating to the arrangement described herein and to a conventional spoiler-slot-deflector system of comparable size will particularly emphasize the effectiveness of the roll control system of our invention. The yawing moments produced by the FIG. 1 system and by a conventional arrangement of similar size were evaluated in connection with the design of a carrier-based, attack-type aircraft. It was observed that a yawing moment reduction of the magnitude of from 64 percent to 100 percent could be obtained by the use of our invention. Further, a comparison of the resulting rolling moments indicates that no substantial loss of moment is experienced through use of this invention. In certain flight situations an improved rolling moment will result. Also, an increase in net lift over the comparable system of conventional configuration was noted; this advantage is of considerable importance with respect to landing sink-rates which are particularly critical with respect to carrier-based aircraft.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

We claim:

1. A roll control system for an air vehicle having laterally opposed wing members, and comprising similarly positioned and sized first means contained in each wing member for causing rolling movement of said air vehicle during flight, similarly positioned and sized second means contained in each wing member for improving the yawing and rolling characteristic of said airplane during rolling movement, and means operably connecting the second means of one of said wing members to the first means of the other of said wing members to effect simultaneous movement thereof and an improved rolling movement in one direction, and operably connecting the second means of said another wing member to the first means of said one wing member to effect simultaneous movement thereof and an improved rolling movement of said air vehicle in an opposite direction, said first means and said second means being located in inboard-outboard relation to each other in each of said wing members.

2. The control system defined in claim 1, wherein the first and second means contained in each wing member are positioned at different distances from the longitudinal axis of said air vehicle, each said second means being positioned at a greater distance from said longitudinal axis than is the first means associated therewith.

3. A control system for an airplane having laterally opposed first and second wing members, and comprising similarly located and sized normal spoiler means positioned in each said wing member for decreasing the aerodynamic lift acting on that wing member during flight, similarly located and sized inverted spoiler means positioned in each wing member for increasing the aerodynamic lift acting on that wing member during flight, and actuating means connected to each of said spoiler means and operatively pairing the inverted spoiler means of said first wing member with the normal spoiler means of said second wing member to cause rolling movement of the airplane in one direction, and operatively pairing the inverted spoiler means of said second wing member with the normal spoiler means of said first wing member to cause rolling movement of the airplane in an opposite direction, said normal spoiler means and said inverted spoiler means being positioned in inboard-outboard relation to each other in each of said wing members.

4. The control system defined in claim 3, wherein each said normal and inverted spoiler means is provided with a surface area contained in the surface of the wing member associated therewith, each said inverted spoiler means surface area being of lesser extent than the surface area of the normal spoiler means associated therewith to thereby balance out a yawing tendency which otherwise exists when said associated normal spoiler means is actuated.

5. The control system defined in claim 3, wherein each said normal and inverted spoiler means includes an upper surface member and a lower surface member which enclose a wing member slot means associated therewith, said normal spoiler means upper surface members and inverted spoiler means lower surface members being rotatable about generally forwardly located axes, and said normal spoiler means lower surface members and inverted spoiler means upper surface members being rotatable about generally rearwardly located axes.

6. In an aircraft control arrangement having laterally opposed spoiler-slot-deflector units provided for roll control, normal spoiler-slot-deflector sections comprising a portion of said spoiler-slot-deflector units, inverted spoiler-slot-deflector sections comprising another portion of said spoiler-slot-deflector units and located in inboard-outboard relation to said normal spoiler-slot-deflector sections, and means connected to all of said spoiler-slot-deflector sections and simultaneously operating the inverted portion of one spoiler-slot-deflector unit with the normal portion of another spoiler-slot-deflector unit to cause roll movement in a first direction, and simultaneously operating the inverted portion of said another spoiler-slot-deflector unit with the normal portion of said one spoiler-slot-deflector unit to cause rolling movement in a direction which is opposite to said first direction.

7. An improved spoiler-slot-deflector unit located to one side of an airplane fuselage in an airplane wing member, and which comprises a normal spoiler-slot-deflector portion having a longitudinal axis which is oriented along the span of said wing member, an inverted spoiler-slot-deflector portion having a longitudinal axis which is oriented along the span of said wing member and which is aligned with said normal spoiler-slot-deflector portion longitudinal axis, and means connected to each of said spoiler-slot-deflection portions for actuating said normal and inverted spoiler-slot-deflector portions independently of each other.

8. The spoiler-slot-deflector unit defined in claim 7, wherein said normal and inverted spoiler-slot-deflector portions are positioned adjacent each other, said normal spoiler-slot-deflector portion being located inboard with respect to said inverted spoiler-slot-deflector portion.

9. The spoiler-slot-deflector unit defined in claim 7, wherein said normal and inverted spoiler-slot-deflector portions each have a surface area located in inboard-outboard relation to each other, said outboard spoiler-slot-deflector portion surface area being of sufficiently lesser extent than said inboard spoiler-slot-deflector portion surface area whereby said spoiler-slot-deflector portions produce equal yawing moments relative to the longitudinal axis of said airplane fuselage.

References Cited in the file of this patent

UNITED STATES PATENTS

| | | |
|---|---|---|
| 2,003,223 | Rose | May 28, 1935 |
| 2,077,071 | Rose | Apr. 13, 1937 |
| 2,557,829 | LaVelle | June 19, 1951 |
| 2,678,784 | Lanier | May 18, 1954 |